US009953247B2

(12) United States Patent
Zhou et al.

(10) Patent No.: US 9,953,247 B2
(45) Date of Patent: Apr. 24, 2018

(54) METHOD AND APPARATUS FOR DETERMINING EYE POSITION INFORMATION

(71) Applicant: Samsung Electronics Co., Ltd., Suwon-si, Gyeonggi-do (KR)

(72) Inventors: Mingcai Zhou, Beijing (CN); Jingu Heo, Yongin-si (KR); Tao Hong, Beijing (CN); Zhihua Liu, Beijing (CN); DongKyung Nam, Yongin-si (KR); Kang Xue, Beijing (CN); Weiming Li, Beijing (CN); Xiying Wang, Beijing (CN); Gengyu Ma, Beijing (CN); Haitao Wang, Beijing (CN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 69 days.

(21) Appl. No.: 15/009,154

(22) Filed: Jan. 28, 2016

(65) Prior Publication Data
US 2016/0225154 A1   Aug. 4, 2016

(30) Foreign Application Priority Data

Jan. 29, 2015   (CN) .......................... 2015 1 0048245
Oct. 30, 2015   (KR) ........................ 10-2015-0152053

(51) Int. Cl.
*G06T 7/73*   (2017.01)
*G06K 9/66*   (2006.01)
(Continued)

(52) U.S. Cl.
CPC ............. *G06K 9/66* (2013.01); *G06K 9/0061* (2013.01); *G06K 9/00604* (2013.01);
(Continued)

(58) Field of Classification Search
CPC ........... G06F 3/013; G06T 2207/30201; G06T 2207/30041; G06T 17/00; G06T 7/73;
(Continued)

(56) References Cited

U.S. PATENT DOCUMENTS 6,542,625 B1 *  4/2003  Lee .................... G06K 9/00228
                                                          348/169
6,664,956 B1 * 12/2003  Erdem .................... G06T 17/20
                                                          345/419

(Continued)

FOREIGN PATENT DOCUMENTS

EP       1271394 A2 *  1/2003  ......... G06K 9/00268
EP       2581034 A1     4/2013
(Continued)

OTHER PUBLICATIONS

Yamazoe, Hirotake, Akira Utsumi, Tomoko Yonezawa, and Shinji Abe. "Remote gaze estimation with a single camera based on facial-feature tracking without special calibration actions." In Proceedings of the 2008 symposium on Eye tracking research & applications, pp. 245-250. ACM, 2008.*

(Continued)

*Primary Examiner* — Sumati Lefkowitz
*Assistant Examiner* — Carol Wang
(74) *Attorney, Agent, or Firm* — Harness, Dickey & Pierce, P.L.C.

(57) ABSTRACT

A method of determining eye position information includes identifying an eye area in a facial image; verifying a two-dimensional (2D) feature in the eye area; and performing a determination operation including, determining a three-dimensional (3D) target model based on the 2D feature; and determining 3D position information based on the 3D target model.

16 Claims, 7 Drawing Sheets

(51) Int. Cl.
  *G06K 9/00* (2006.01)
  *H04N 13/04* (2006.01)
  *G06T 5/00* (2006.01)

(52) U.S. Cl.
  CPC .......... *G06K 9/00617* (2013.01); *G06T 5/005* (2013.01); *G06T 7/73* (2017.01); *G06T 7/75* (2017.01); *H04N 13/0472* (2013.01); *G06T 2207/30041* (2013.01); *G06T 2207/30201* (2013.01)

(58) Field of Classification Search
  CPC ........... G06T 7/75; G06T 7/251; G06T 5/005; G06K 9/00671; G06K 9/00597; G06K 9/00281; G06K 9/00248; G06K 9/00288; G06K 9/00268; G06K 9/00228; G06K 9/00221; G06K 9/66; G06K 9/00604; G06K 9/0061; G06K 9/00617; G06K 9/00208; G06K 9/00261; H04N 13/0472
  See application file for complete search history.

(56) References Cited

U.S. PATENT DOCUMENTS

| | | | | |
|---|---|---|---|---|
| 9,077,890 B2* | 7/2015 | Sweet, III | .......... | H04N 5/23212 |
| 2004/0005083 A1* | 1/2004 | Fujimura | ............... | A61B 3/113 |
| | | | | 382/103 |
| 2005/0163383 A1* | 7/2005 | Kim | ................... | G06K 9/00597 |
| | | | | 382/209 |
| 2006/0029265 A1* | 2/2006 | Kim | .................... | G06K 9/4614 |
| | | | | 382/118 |
| 2006/0139447 A1 | 6/2006 | Unkrich | | |
| 2006/0245639 A1* | 11/2006 | Jiang | ................. | G06K 9/00288 |
| | | | | 382/154 |
| 2007/0098230 A1* | 5/2007 | Norita | ............... | G06K 9/00214 |
| | | | | 382/118 |
| 2011/0243385 A1* | 10/2011 | Nishino | ................. | G06T 7/223 |
| | | | | 382/103 |
| 2013/0044055 A1* | 2/2013 | Karmarkar | ............. | G06F 3/013 |
| | | | | 345/158 |
| 2014/0306875 A1* | 10/2014 | He | ......... | G06F 3/017 |
| | | | | 345/156 |
| 2015/0125049 A1* | 5/2015 | Taigman | ............ | G06K 9/00268 |
| | | | | 382/118 |
| 2015/0206014 A1* | 7/2015 | Wu | ........................ | G08G 1/168 |
| | | | | 348/149 |
| 2015/0243031 A1* | 8/2015 | Narasimha | ........... | G06T 7/0042 |
| | | | | 382/103 |
| 2015/0294148 A1* | 10/2015 | Mohanakrishnan | ........................ | |
| | | | | G06K 9/00261 |
| | | | | 382/103 |
| 2016/0063303 A1* | 3/2016 | Cheung | .................. | A61B 3/113 |
| | | | | 382/103 |
| 2016/0202756 A1* | 7/2016 | Wu | ........................ | G06F 3/013 |
| | | | | 382/103 |

FOREIGN PATENT DOCUMENTS

| | | |
|---|---|---|
| JP | 2012169759 A | 9/2012 |
| JP | 2014103502 A | 6/2014 |
| KR | 20100105591 A | 9/2010 |
| KR | 101082691 B1 | 11/2011 |
| KR | 10-1122513 B1 | 3/2012 |
| KR | 101200096 B1 | 11/2012 |

OTHER PUBLICATIONS

Xiong, Xuehan, and Fernando De la Torre. "Supervised descent method and its applications to face alignment." In Proceedings of the IEEE conference on computer vision and pattern recognition, pp. 532-539. 2013.*

* cited by examiner

METHOD AND APPARATUS FOR DETERMINING EYE POSITION INFORMATION

CROSS-REFERENCE TO RELATED APPLICATION

This application claims under 35 U.S.C. § 119 to Chinese Patent Application No. 201510048245.6 filed on Jan. 29, 2015, in the State Intellectual Property Office of the People's Republic of China and Korean Patent Application No. 10-2015-0152053 filed on Oct. 30, 2015 in the Korean Intellectual Property Office, the entire contents of each of which are incorporated herein by reference.

BACKGROUND

1. Field

At least one example embodiment relates to three-dimensional (3D) display technology and more particularly, to a method and apparatus for determining 3D eye position information.

2. Description of the Related Art

As compared to two-dimensional (2D) display technology, three-dimensional display technology may represent a real world to provide a reality to the user experiencing contents on a display and thus, is drawing an attention of various fields such as science research, an entertainment, a medical service, a military service, and the like. Based on an image formative principle, the 3D display technology may be divided into 3D stereoscopic display technology based on a disparity of both eyes, and 3D autostereoscopic display technology represented by, for example, holography and optical lattice.

In a 3D display system, a user may need to wear equipment, for example, glasses for polarized glasses and a helmet to view a 3D image, which may cause an inconvenience of the user. Accordingly, there has been provided a 3D autostereoscopic display device such as a smartphone and a tablet personal computer (PC) providing a 3D autostereoscopic display function.

SUMMARY

Some example embodiments relate to a method of determining eye position information.

In some example embodiments, the method may include identifying an eye area in a facial image, verifying a two-dimensional (2D) feature in the eye area, and performing a determination operation including determining a three-dimensional (3D) target model based on the 2D feature and determining 3D position information based on the 3D target model.

The determining may include obtaining a parameter associated with the 2D feature, and establishing the 3D target model based on the parameter.

The determining may include obtaining a matrix based on the 2D feature and the 3D target model, and determining the 3D position information based on the matrix.

The verifying may include determining whether an eye is in a stationary state by comparing a first frame and a second frame of the eye area, the second frame being subsequent to the first frame, and verifying the 2D feature in the eye area in response to a determination that the eye is not in the stationary state.

The determining whether the eye is in the stationary state may further include determining previously determined 3D position information to be current 3D position information in response to a determination that the eye is in the stationary state.

The determining whether the eye is in the stationary state may include calculating a normalized correlation coefficient of a previous image frame of the eye area and a current image frame of the eye area, and determining that the eye is in the stationary state when the normalized correlation coefficient exceeds a threshold.

The method may further include converting the 3D position information to a 3D coordinate system of a display, and adjusting or rendering a 3D image of the display based on a result of the converting.

The verifying may include determining a supervised descent method (SDM) model based on a local binary pattern (LBP), and verifying a 2D feature in the eye area based on the SDM model.

The verifying the 2D feature in the eye area based on the SDM model may include acquiring a sample area by measuring an eye area in a sample image, and performing a repetitive training on the SDM model based on a sample feature measured in the sample area.

The performing of the repetitive training may include extracting an approximate feature of the sample area in an initial repetitive training, and extracting a precise feature of the sample area in a subsequent repetitive training, wherein the approximate feature may include at least one of a histogram of oriented gradients (HOG) feature, a multi-block local binary pattern (MB-LBP) feature, a speeded up robust feature (SURF), and an oriented FAST and rotated BRIEF (ORB) feature, FAST being features of accelerated segment test and BRIEF being binary robust independent elementary features, and the precise feature may include at least one of an LBP feature, a Gabor wavelet feature, a discrete cosine transform (DCT) feature, and the BRIEF.

The performing of the repetitive training may include extracting a feature of the sample area and performing training on an SDM model acquired during a previous repetitive training process in different-sized spaces, comparing the SDM model on which the training is performed in each different-sized spaces to a feature of the sample area measured in advance, and selecting an SDM model from a plurality of SDM models based on a result of the comparing and applying the selected SDM model to a subsequent repetitive training process.

The identifying may include determining a position of an eye, generating a virtual eye frame based on the determined position, and acquiring the eye area in a facial image corresponding to a current frame based on the virtual eye frame, wherein the determined position may be associated with position information of the 2D feature.

Other example embodiments relate to an apparatus for determining eye position information.

In some example embodiments, the apparatus may include an identifier configured to identify an eye area in a facial image a feature verifier configured to verify a 2D feature in the eye area, and a 3D position information determiner configured to determine a 3D target model based on the 2D feature and determine 3D position information based on the 3D target model.

The 3D position information determiner may include a model establisher configured to obtain a parameter by determining the 2D feature and establish the 3D target model based on the parameter, a matrix calculator configured to obtain a matrix based on the 3D target model and the 2D feature, and a position information determiner configured to determine 3D position information based on the 3D target model and the matrix.

The apparatus may further include a stationary state determiner configured to compare a first frame and a second frame of the eye area and determine whether an eye is in a stationary state, the second frame being subsequent to the first frame, wherein the feature verifier may be configured to verify the 2D feature in the eye area in response to a determination that the eye is not in the stationary state.

The feature verifier may be configured to determine previously determined 3D eye position information to be current 3D eye position information in response to a determination that the eye is in the stationary state.

The stationary state determiner may be configured to calculate a normalized correlation coefficient of a previous image frame of the eye area and a current image frame of the eye area, and determine that the eye is in the stationary state when the normalized correlation coefficient exceeds a threshold.

The apparatus may further include a coordinate system converter configured to convert the 3D position information determined by the 3D position information determiner to a 3D coordinate system of a display, and an image adjuster configured to adjust or render a 3D image of the display based on the 3D position information.

The feature verifier may be configured to verify the 2D feature in the eye area using an SDM module.

The apparatus may further include an SDM model training performer configured to determine a sample area by measuring an eye area in a photographed sample image and perform repetitive training on an SDM model based on a sample feature measured in the sample area.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", an and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may be implemented as various forms, for example, a personal computer (PC), a laptop computer, a tablet computer, a television (TV), a smart home appliance, an intelligent vehicle, kiosks, and a wearable device. The example embodiments may be applied to authenticate a user in, for example, a smartphone, a mobile device, and a smart home system. The example embodiments may he applied to a payment service based on a user authentication. Also, the example embodiments may be applied to an intelligent vehicle system for automatically starting an ignition by authentication a user. Hereinafter, example embodiments will be described in detail with reference to the accompanying drawings, wherein like reference numerals refer to like elements throughout.

Figure 1:
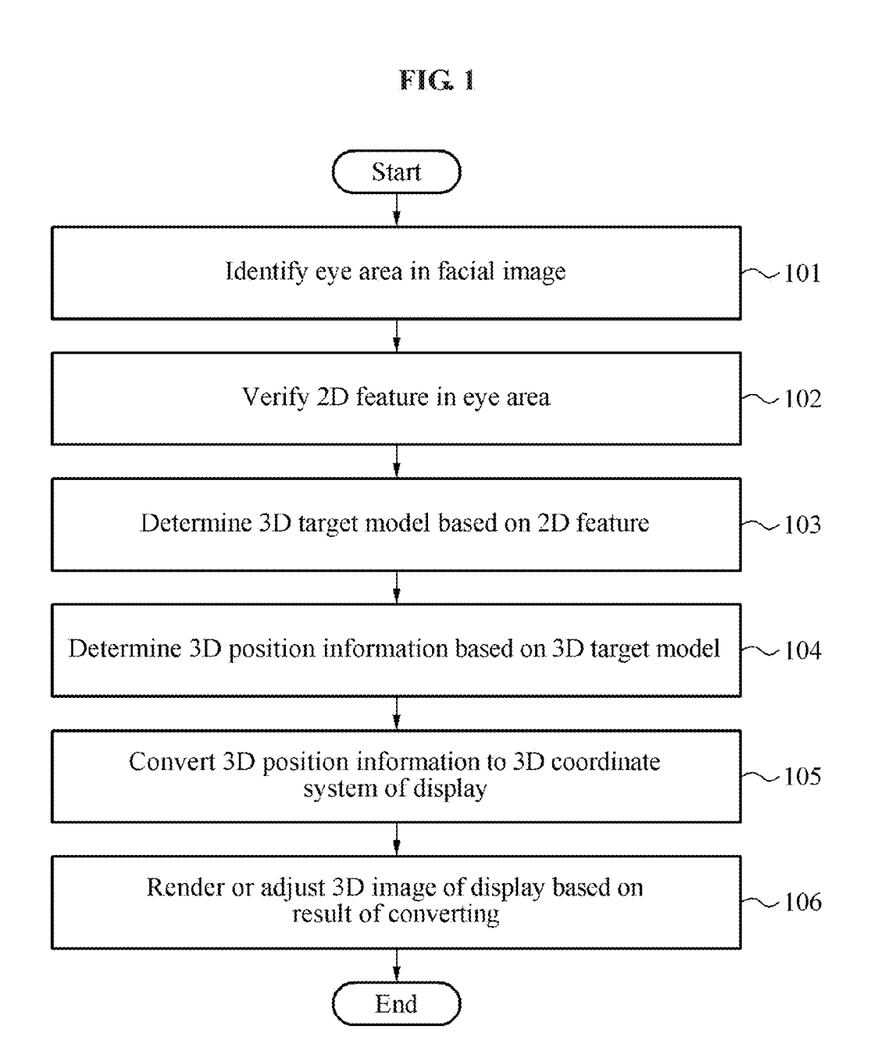
FIG. 1 illustrates a method of determining three-dimensional (3D) position information according to at least one example embodiment.

FIG. 1 illustrates a method of determining three-dimensional (3D) position information according to at least one example embodiment.

The method may include operation 101 for identifying an eye area in a facial image.

In operation 101, an eye may be identified in the facial image, extract a portion corresponding to the eye identified from the facial image, and identify the portion to be the eye area.

In this example, to increase identification efficiency and accuracy of the eye area, a virtual eye contour frame based on a previous eye area identification result, and acquire the eye area by identifying the eye area from the facial image of a current frame based on the generated virtual eye contour frame.

The previous eye area identification result may be associated with, for example, position information of a two-dimensional (2D) feature determined based on a previous eye image. Since the position information of the 2D feature has a relatively high accuracy, identification efficiency and accuracy of the eye area may increase by applying an image capturing the eye area that is acquired using the virtual eye contour frame generated based on the position information.

The method may include operation 102 for verifying the 2D feature in the eye area.

In operation 102, a mobile device may verify the 2D feature in the eye area using pre-trained Hessian matrix and remaining term. Hereinafter, the Hessian matrix and the remaining term may also be referred to as, for example, a supervised descent method (SDM) model.

Figure 2:
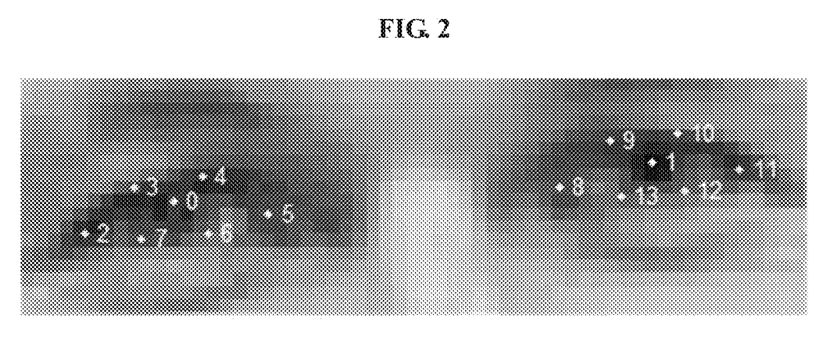
FIG. 2 illustrates a two-dimensional (2D) feature acquired using a supervised descent method (SDM) model according to at least one example embodiment.

FIG. 2 illustrates a 2D feature acquired using an SDM model according to at least one example embodiment.

In a process of verifying a 2D feature using a pre-trained SDM model, a precise feature, for example, a local binary pattern (LBP) may be extracted from an eye area, and the 2D feature may be acquired by performing a repetitive training on the SDM model based on the extracted precise feature.

In an example, to increase an accuracy on the 2D feature calculated using the SDM model, an eye area may be acquired from a current frame image based on a virtual eye contour frame generated in operation 101. An image of the eye area may be acquired by downsizing or upsizing an eye area acquired before the 2D feature is determined to be in a desired or, alternatively, predetermined size.

A state in which a user is not straightly staring at a camera with both eyes, for example, a state in which a head part tilts to one side may be assumed. In this example, after identifying the eye area in operation 101 the acquired image of the eye area may be rotated at a desired or, alternatively, predetermined angle such as the user straightly stares at the camera. Similarly, after the rotating, a 2D feature of an eye area in the rotated image may be calculated using the SDM model and the rotated image may be reversely rotated, thereby determining of the 2D feature of the eye area identified in operation 101.

In an example, when the 2D feature is verified in the eye area, whether the eye is in a stationary state may be determined by comparing a frame and a subsequent frame of the eye area. In response to a determination that the eye is not in the stationary state, the 2D feature may be verified in the eye area. In response to a determination that the eye is in the stationary state, previously determined 3D position information may be determined to be current 3D position information.

To determine whether the eye is in a stationary state, a current frame of the eye area may be compared to a previous frame of the eye area and whether motion information of frames is present may be verified. When the motion information of the frames is absent, the eye may be determined to be in the stationary state. The motion information of the frames may be determined based on, for example, a change in pixel between images.

A normalized correlation coefficient (NCC) between the current frame and the previous frame of the eye area may be calculated to compare the current frame and the previous frame. When the calculated NCC is greater than a threshold, the eye may be determined to be in the stationary state. When the calculated NCC is less than or equal to the threshold, the eye may be determined not to be in the stationary state.

As an example, an NCC between a current image frame and a previous image frame of the eye area may be calculated based on Equation 1 as shown below.

$$NCC = \frac{\sum_{x,y}(C(x,y) - \overline{C})(P(x,y) - \overline{P})}{\sqrt{\sum_{x,y}(C(x,y) - \overline{C})^2 \sum_{x,y}(P(x,y) - \overline{P})^2}} \quad \text{[Equation 1]}$$

In Equation 1, $C(x, y)$ and $P(x, y)$ are gray values of pixels corresponding to coordinates $(x, y)$ in the current image frame and the previous image frame of the eye area, respectively. $\overline{C}$ and $\overline{P}$ are mean gray values of the current image frame and the previous image frame of the eye area, respectively.

Figure 3:
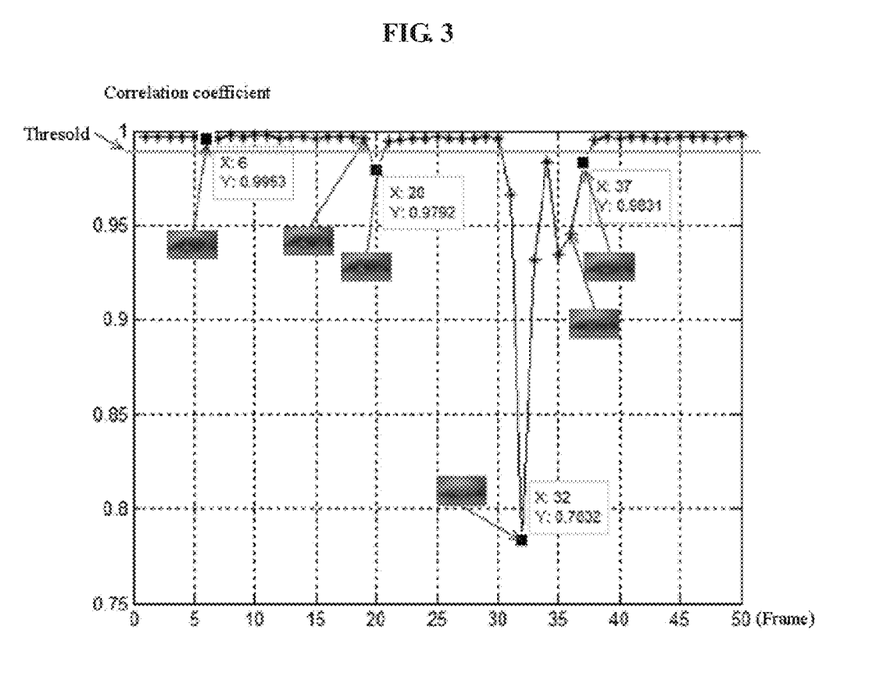
FIG. 3 illustrates a normalized correlation coefficient of 50 image frames of an eye area according to at least one example embodiment.

FIG. 3 illustrates a normalized correlation coefficient of 50 image frames of an eye area according to at least one example embodiment.

Referring to FIG. 3, when an eye is in a stationary state, an NCC between neighboring frames may have a value greater than or equal to 0.995, which is a relatively high value. In response to an eye blinking motion, the NCC may decrease. As illustrated in FIG. 3, an NCC of a 32$^{th}$ frame is about 0.78 decreased when compared to a previous NCC. Thus, by setting a threshold to be 0.99, the eye in the stationary state may be identified.

To increase an accuracy of 3D position information, a reliability evaluation may be performed on a 2D feature. The reliability evaluation may be performed on an acquired SDM model based on a LBP feature extracted during a process of determining the 2D feature and position information of the 2D feature determined based on the LBP feature.

The LBP feature may be extracted in the process of determining the 2D feature using the SDM model, and the 2D feature may be verified by performing a repetitive training using a pre-trained SDM model based on the extracted LBP feature.

In an example, a pre-trained support vector machine (SVM) classifier may be used to perform a classification on the LBP feature, thereby verifying whether the LBP feature is to reflect an actual LBP feature of the eye area. When the LBP feature is determined to reflect the actual LBP feature, an evaluation result may be matched to the 2D feature. When the LBP feature is determined not to reflect the actual LBP feature, the evaluation result may not be matched to the 2D feature. Similarly, when the evaluation result matches the 2D feature, a 3D target model may be determined based on the 2D feature in operation 103. When the evaluation result does not match the 2D feature, identifying of the eye area and verifying the 2D feature may be repetitively performed by returning to operations 101 and 102.

The SVM classifier may acquire a positive sample feature and a negative sample feature. An area to which an actual shape of the eye is accurately applied may be acquired as a positive sample, and an area to which the actual shape of the eye is inaccurately applied may be acquired as a negative sample. In this example, an LBP feature extracted from the area acquired as the positive sample may be the positive sample feature, and an LBP feature extracted from the area acquired as the negative sample may be the negative sample feature.

Figure 4:
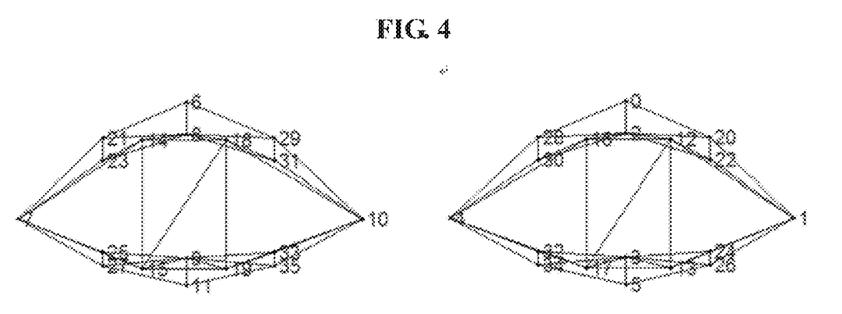
FIG. 4 illustrates a 3D target model according to at least one example embodiment.

FIG. 4 illustrates a 3D target model according to at least one example embodiment.

A method of determining eye position information may include operation 103 for determining a 3D target model based on a 2D feature.

In operation 103, a parameter associated with a 2D feature determined in operation 102 may be obtained. For example, eye parameters a and a may be obtained based on Equation 2 as shown below.

$$g(\sigma,\alpha)=\bar{g}+S\sigma+A\alpha \quad \text{[Equation 2]}$$

In Equation 2, $g(\sigma, \alpha)$ indicates a common 3D eye model acquired from a common 3D face model. The value $\bar{g}$ denotes a common average 3D eye shape, S denotes a shape vector that is a vector for a shape of an eye, A denotes an expression vector that is a vector for a facial expression, and $\sigma$ and $\alpha$ denote an eye parameter corresponding to the shape vector S and an eye parameter corresponding to the expression vector A, respectively. In practice, the shape vector S may be obtained based on a facial image photographed in advance, and the expression vector A may be obtained based on a plurality of facial image frames photographed in advance.

The 3D target model g' ($\sigma$, $\alpha$) may be established based on the eye parameters $\sigma$ and $\alpha$, the common average 3D eye shape $\bar{g}$, the expression vector A, and the shape vector S obtained through a previous fitting as illustrated in FIG. 4.

The method may include operation 104 for determining 3D position information based on the 3D target model.

For example, a stiffness matrix may be obtained based on the 3D target model and the 2D feature determined in operation 102, and the 3D position information may be determined based on the stiffness matrix and the 3D target model obtained through a fitting in operation 103.

In operation 104, the stiffness matrix may be obtained, for example, through a minimization of a target function as shown in Equation 3 below.

$$\min\|s'-P(Q(g'(\sigma,\alpha)))\|^2 \quad \text{[Equation 3]}$$

In Equation 3, P denotes a perspective projection conversion matrix, Q denotes a stiffness conversion matrix, $g'(\sigma, \alpha)$ indicates the 3D target model, and s' denotes the 2D feature.

After the 3D position information is determined in operation 104, a 3D display may be realized through operations 105 and 106 as follows.

The method may include operation 105 for converting the 3D position information to a 3D coordinate system on a display of a mobile device.

The 3D position information determined in operation 104 may be based on a 3D coordinate system of a camera photographing the eye, and a 3D image viewed by a user may be based on a 3D coordinate system of a display screen. Thus, the 3D position information provided in the 3D coordinate system of the camera may be converted to be provided in the 3D coordinate system of the display screen of the mobile device.

The method may include operation 106 for rendering or adjusting contents of the displayed 3D image based on a result of the converting.

In practice, 3D position information of the eye relative to the display screen of the mobile device may be determined by integrating inner parameters, for example, a main point position and a focal distance, of the camera and applying 3D position information after the converting. Subsequently, based on the 3D position information relative to the display screen, a realistic 3D image may be realized to be viewed by the user in a current location by rendering or adjusting the displayed contents.

Figure 5:
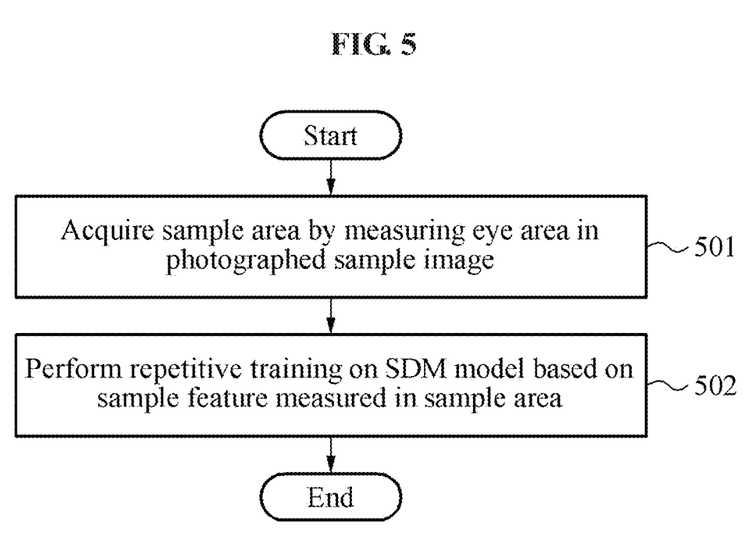
FIG. 5 illustrates an SDM model training method according to at least one example embodiment.

FIG. 5 illustrates an SDM model training method according to at least one example embodiment.

The SDM model applied in operation 102 may be a previously trained model. An SDM model training method will be described based on the following operations with reference to FIG. 5.

An operation of determining an SDM model may include operation 501 for acquiring a sample area by measuring an eye image in a sample image photographed in advance.

In operation 501, an image acquiring device, for example, a camera, may be used to collect a sample facial image of a user. During the collecting of the sample facial image, the camera may acquire sample facial images by capturing a face of the user making various poses. Subsequently, an eye area may be identified from each of the sample facial images, thereby acquiring a sample area. After collecting sample areas, the sample feature may be acquired from each of the sample areas.

The operation of determining the SDM model may include operation 502 for performing a repetitive training on an SDM model based on the sample feature acquired from the sample area. For example, based on a sequential relationship of duration of the repetitive training, a training process of the SDM model may be divided into an initial repetitive training and a subsequent repetitive training. To increase a precision of the SDM model, the training may be performed by extracting an approximate feature from the sample area in the initial repetitive training, and the training may be performed by extracting a precise feature from the sample area in the subsequent repetitive training. The approximate feature may include at least one of a histogram of oriented gradients (HOG) feature, a multi-block local binary pattern (MB-LBP) feature, a speeded up robust feature (SURF), and an oriented FAST and rotated BRIEF (ORB) feature, FAST being accelerated segment test features and BRIEF being binary robust independent elementary features.

The precise feature may include at least one of an LBP feature, a Gabor wavelet feature, a discrete cosine transform (DCT) feature, and the BRIEF.

In one training process, a sample area of a different-sized space may be acquired by downsizing and upsizing the sample area based on a desired or, alternatively, predetermined ratio. Subsequently, a feature may be extracted from a corresponding sample area and the training may be performed on an SDM model acquired in a previous training process. The feature extracted from the sample area may be an approximate feature or a precise feature. In this example, the training may be performed on an SDM model acquired from each different-sized space, and a 2D feature acquired from a sample area corresponding to the different-sized space may be used to be an output result of an SDM model on which the training is performed in the different-sized space.

The output result may be compared to a pre-measured sample feature, and an SDM model corresponding to an output result having a highest similarity may be used in a subsequent training process. In practice, the SDM model corresponding to the output result having the highest similarity may be trained about the different-sized space of the sample area used by the SDM model such that the different-sized space is a desired or, alternatively, optimal sized space of the SDM model. Also, the sample area having the desired or, alternatively, optimal sized space may be applied to be a sample area in a subsequent training process.

As described above, through an application of two types of features, a training may be performed on an SDM model in an initial process and a subsequent process, a desired or, alternatively, optimal sized space may be selected in each training process, and an SDM model trained in the selected desired or, alternatively, optimal sized space may be used in a subsequent training process, thereby increasing an accuracy of a 2D feature.

Figure 6:
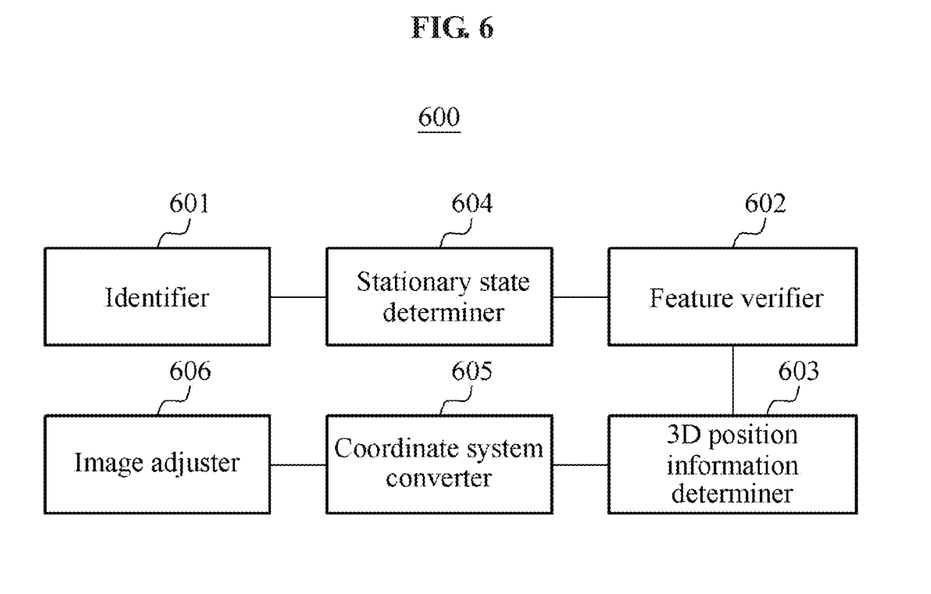
FIG. 6 illustrates an apparatus for determining 3D position information according to at least one example embodiment.

FIG. 6 illustrates an apparatus for determining 3D position information according to at least one example embodiment.

The apparatus may include an identifier 601, a feature verifier 602, and a 3D position information determiner 603.

The identifier 601 may identify an eye area from a facial image. The feature verifier 602 may verify a 2D feature from the eye area identified by the identifier 601. For example, the feature verifier 602 may verify the 2D feature from the eye area using a prestored SDM model (e.g., an SDM model stored before the verification of the 2D feature).

The 3D position information determiner 603 may determine a 3D target model based on the 2D feature determined by the feature verifier 602 and determine 3D position information based on the determined 3D target model.

When a user views a video, a head part of the user may be in substantially the same position for the most of the time. In this example, an eye may also be located at subsequently the same position relative to a display screen of a mobile device. Thus, the apparatus may further include a stationary state determiner 604 to identify the 3D position information with an increased efficiency.

The stationary state determiner 604 may determine whether an eye is in a stationary state based on a similarity between neighboring frames of the identified eye area or motion information of the neighboring frames, and output a result of the determining.

In an example, the stationary state determiner 604 may determine whether an eye is in a stationary state based on a similarity between neighboring frames of the identified eye area or motion information of the neighboring frames. In this example, the stationary state determiner 604 may calculate an NCC between a current frame of the eye area and a previous frame of the eye area, and determine the eye is in the stationary state when the NSS exceeds a threshold.

The feature verifier 602 may verify the 2D feature in the eye area when a determination result output from the stationary state determiner 604 indicates that the eye is not in the stationary state. The feature verifier 602 may apply previous 3D position information to be current 3D position information of the current frame when a determination result output from the stationary state determiner 604 indicates that the eye is not in the stationary state.

Also, the 3D position information determined by the 3D position information determiner 603 may be based on a 3D coordinate system of a camera of a mobile device. Thus, 3D position information of the eye relative to a display of the mobile device, the apparatus may further include a coordinate system converter 605 and an image adjuster 606. Here, the image adjuster 606 may also be referred to as, for example, a display content adjustment module 606.

The coordinate system converter 605 may convert the 3D position information determined by the 3D position information determiner 603 to a 3D coordinate system of the display screen. The image adjuster 606 may render or adjust contents of a 3D image displayed on the displayed screen based on 3D position information provided after the converting. To increase an accuracy of finally determined 3D position information, the apparatus may further include a reliability evaluator (not shown).

The reliability evaluator may acquire an LBP feature extracted in a process during which the feature verifier 602 verifies the 2D feature using an SDM model, and perform a reliability evaluation based on an LBP feature acquired using a classifier and position information of the 2D feature verified by the feature verifier 602.

As an example, the reliability evaluator may perform a classification on the extracted LBP feature the using a pre-trained SVM classifier, and verify verifying whether the LBP feature is to reflect an actual LBP feature of the eye area. When the LBP feature is determined to reflect the actual LBP feature, an evaluation result may be matched to the 2D feature. When the LBP feature is determined not to reflect the actual LBP feature, the evaluation result may not be matched to the 2D feature. Similarly, when the evaluation result matches the 2D feature, the 3D position information determiner 603 may determine a 3D target model the 2D feature. Additionally, when the evaluation result indicates that the 3D position information has a low reliability, the reliability evaluator may allow the identifier 601 to identify the eye area again.

In an example, the apparatus may further include an SVM classifier training module.

The an SVM classifier training module may apply an LBP feature extracted from an eye area acquired as a positive sample to be a positive sample feature, apply an LBP feature extracted from an eye area acquired as a negative sample to be a negative sample feature, and train the SVM classifier based on the positive sample feature and the negative sample feature.

The SDM model used in the feature verifier 602 may be, for example, a pre-stored model, trained using other devices, and trained in advance using the apparatus.

Also, the apparatus may further include an SDM training module (not shown).

The SDM training module may apply an eye area detected from a photographed sample facial image to be a sample area, and perform a repetitive training on an SDM model based on a sample feature acquired from the sample area. The SDM training module may include, for example, a sample collector, an initial repetitive training performer, and a subsequent repetitive training performer. The sample collector may apply an eye area identified from a sample facial image to be a sample area. The initial repetitive training performer may extract an approximate feature from the sample area acquired by the sample collector in the initial repetitive training, and perform training on the SDM model based on the extracted approximate feature. The subsequent repetitive training performer may extract a precise feature from the sample area acquired by the sample collector in the subsequent repetitive training, and perform training on the SDM model based on the extracted precise feature. The approximate feature may include at least one of an HOG feature, an MB-LBP feature, a SURF, and an ORB feature. The precise feature may include at least one of an LBP feature, a Gabor wavelet feature, a DCT feature, and the BRIEF.

In one training process, the initial repetitive training performer or the subsequent repetitive training performer may acquire a sample area of a different-sized space by downsizing and upsizing the sample area based on a desired or, alternatively, predetermined ratio. Subsequently, a feature may be extracted from a corresponding sample area and the training may be performed on an SDM model acquired in a previous training process. In this example, the training may be performed on an SDM model acquired from each different-sized space, and a 2D feature acquired from a sample area corresponding to the different-sized space may be used to be an output result of an SDM model on which the training is performed in the different-sized space. The output result may be compared in similarity to a pre-measured sample key point, and an SDM model corresponding to an output result having a highest similarity may be used in a subsequent training process.

As such, through an application of two types of features, a training may be performed on an SDM model in an initial process and a subsequent process, a desired or, alternatively, optimal sized space may be selected in each training process, and an SDM model trained in the selected desired or, alternatively, optimal sized space may be used in a subsequent training process, thereby increasing an accuracy of a 2D feature calculated by an SDM model acquired in the subsequent training process.

In an example, to increase accuracy and efficiency in identifying an eye area, the identifier 601 may identify the eye area based on a previous eye positioning result.

The identifier 601 may include, for example, an eye contour frame calculator and an eye area acquirer. The eye contour frame calculator may generate a virtual eye contour frame based on the previous eye positioning result. The previous eye positioning result may be associated with position information of a 2D feature determined based on a previous facial image.

The eye area acquirer may acquire an image clipped from a facial image of a current frame based on the virtual eye contour frame generated by the eye contour frame calculator.

In practice, the eye area acquirer may also apply the clipped image to be an image of the identified eye area by downscaling or upscaling the clipped image to be in a desired or, alternatively, predetermined size.

Figure 7:
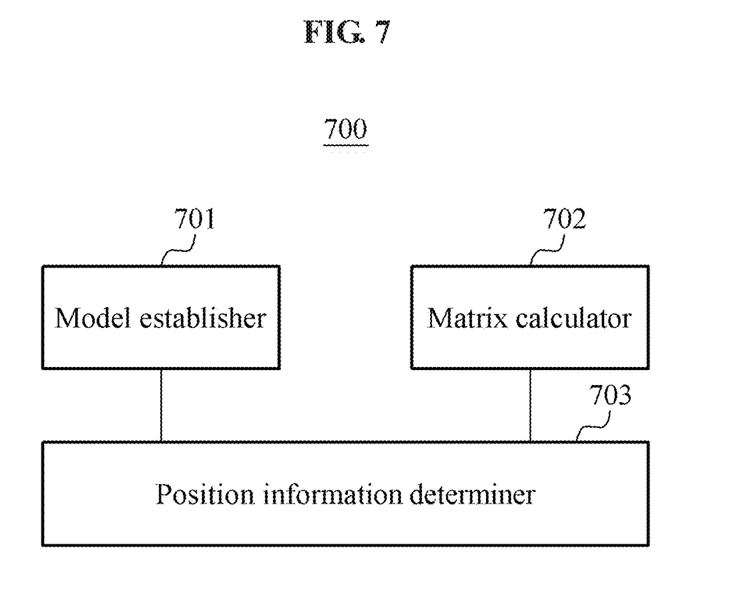
FIG. 7 illustrates a module to determine 3D position information according to at least one example embodiment.

Referring to FIG. 7, a position information determining module may include a model establisher 701, a matrix calculator 702, and a position information determiner 703.

The model establisher 701 may obtain a parameter associated with a 2D feature verified by the feature verifier 602 and establish a 3D target model based on the parameter. The matrix calculator 702 may obtain a stiffness matrix using the 3D target model established by the model establisher 701 and the 2D feature verified by the feature verifier 602. The position information determiner 703 may determine 3D position information based on 3D target model established by the model establisher 701 and the stiffness matrix obtained by the matrix calculator 702. Since modules of an apparatus for determining 3D position infromation and functions of each element included in the corresponding module are decribed based on related operations in a method of determining 3D position information with reference to the foregoing descriptions, repeated descriptions will be omitted here.

In an example, a 2D feature may be verified in an eye area identified from a facial image, a 3D target model may be determined based on the 2D feature, and 3D position information may be determined based on the 3D target model. Also, a 3D image displayed on a display screen may be rendered or adjusted to achieve an enhanced precision of the 3D position information.

The units and/or modules described herein may be implemented using hardware components and software components. For example, the hardware components may include microphones, amplifiers, band-pass filters, audio to digital convertors, and processing devices. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of determining eye position information, the method comprising:
   identifying an eye area in a facial image;
   verifying a two-dimensional (2D) feature in the eye area; and
   performing a determination operation including,
      determining a three-dimensional (3D) target model based on the 2D feature; and
      determining 3D position information of an eye corresponding to the eye area, based on the 3D target model,
   wherein the verifying includes,
      determining a supervised descent method (SDM) model based on a local binary pattern (LBP), and
      verifying the 2D feature in the eye area based on the SDM model, and
         wherein verifying the 2D feature in the eye area based on the SDM model includes,
            acquiring a sample area by measuring an eye area in a sample image, and
            performing a repetitive training on the SDM model based on a sample feature measured in the sample area.

2. The method of claim 1, wherein the determination operation includes,
   obtaining a parameter associated with the 2D feature; and
   establishing the 3D target model based on the parameter.

3. The method of claim 1, wherein the determination operation includes,
   obtaining a matrix based on the 2D feature and the 3D target model; and
   determining the 3D position information based on the matrix.

4. The method of claim 1, wherein the verifying comprises:
   determining whether an eye is in a stationary state by comparing a first frame and a second frame of the eye area, the second frame being subsequent to the first frame; and
   verifying the 2D feature in the eye area in response to a determination that the eye is not in the stationary state.

5. The method of claim 4, wherein the determining whether the eye is in the stationary state further comprises:
   determining previously determined 3D position information to be current 3D position information in response to a determination that the eye is in the stationary state.

6. The method of claim 4, wherein the determining whether the eye is in the stationary state comprises:
   calculating a normalized correlation coefficient of a previous image frame of the eye area and a current image frame of the eye area; and
   determining that the eye is in the stationary state when the normalized correlation coefficient exceeds a threshold.

7. The method of claim 1, further comprising:
   converting the 3D position information to a 3D coordinate system of a display; and
   adjusting or rendering a 3D image of the display based on a result of the converting.

8. The method of claim 1, wherein the performing of the repetitive training comprises:
   extracting an approximate feature of the sample area in an initial repetitive training; and
   extracting a precise feature of the sample area in a subsequent repetitive training,
   wherein the approximate feature includes at least one of a histogram of oriented gradients (HOG) feature, a multi-block local binary pattern (MB-LBP) feature, a speeded up robust feature (SURF), and an oriented FAST and rotated BRIEF (ORB) feature, FAST being features of accelerated segment test and BRIEF being binary robust independent elementary features, and
   the precise feature includes at least one of an LBP feature, a Gabor wavelet feature, a discrete cosine transform (DCT) feature, and the BRIEF.

9. The method of claim 8, wherein the performing of the repetitive training comprises:
   extracting a feature of the sample area and performing training on an SDM model acquired during a previous repetitive training process in different-sized spaces;
   comparing the SDM model on which the training is performed in each different-sized spaces to a feature of the sample area measured in advance; and
   selecting an SDM model from a plurality of SDM models based on a result of the comparing and applying the selected SDM model to a subsequent repetitive training process.

10. The method of claim 1, wherein the identifying comprises:
    determining a position of an eye;
    generating a virtual eye frame based on the determined position; and
    acquiring the eye area in a facial image corresponding to a current frame based on the virtual eye frame, wherein the determined position is associated with position information of the 2D feature.

11. An apparatus for determining eye position information, the apparatus comprising:
    memory storing computer-executable instructions; and
    one or more processors configured to execute the computer-executable instructions such that the one or more processors are configured to,
    identify an eye area in a facial image,
    verify a two-dimensional (2D) feature in the eye area, and
    determine a three-dimensional (3D) target model, based on the 2D feature and determine 3D position information of an eye corresponding to the eye area, based on the 3D target model,
    wherein the verifying of the 2D feature in the eye area includes verifying the 2D feature using a supervised descent method (SDM) module based on a local binary pattern (LBP), and
    wherein the one or more processors are configured to excute the computer-executable instructions such that the one or more processors are further configured to,
        determine a sample area by measuring an eye area in a photographed sample image, and
        perform repetitive training on an SDM model based on a sample feature measured in the sample area.

12. The apparatus of claim 11, wherein the one or more processors are configured to execute the computer-executable instructions such that the one or more processors are further configured to,
    obtain a parameter by determining the 2D feature and establish the 3D target model based on the parameter;
    obtain a matrix based on the 3D target model and the 2D feature; and
    determine 3D position information based on the 3D target model and the matrix.

13. The apparatus of claim 11, wherein the one or more processors are configured to execute the computer-executable instructions such that the one or more processors are further configured to,
    compare a first frame and a second frame of the eye area and determine whether an eye is in a stationary state, the second frame being subsequent to the first frame,
    the verifying of the 2D feature in the eye area including verifying the 2D feature in the eye area in response to a determination that the eye is not in the stationary state.

14. The apparatus of claim 13, wherein the one or more processors are configured to execute the computer-executable instructions such that the one or more processors are further configured to determine previously determined 3D eye position information to be current 3D eye position information in response to a determination that the eye is in the stationary state.

15. The apparatus of claim 13, wherein the one or more processors are configured to execute the computer-executable instructions such that the one or more processors are further configured to,
    calculate a normalized correlation coefficient of a previous image frame of the eye area and a current image frame of the eye area, and
    determine that the eye is in the stationary state when the normalized correlation coefficient exceeds a threshold.

16. The apparatus of claim 11, wherein the one or more processors are configured to execute the computer-executable instructions such that the one or more processors are further configured to,
    convert the 3D position information determined by the 3D position information determiner to a 3D coordinate system of a display, and
    adjust or render a 3D image of the display based on the 3D position information.

* * * * *